United States Patent [19]

Miller

[11] 4,224,559

[45] Sep. 23, 1980

[54] REMOTE POSITION CONTROL METHOD AND MEANS

[76] Inventor: C. Fredrick Miller, 2165 N. Glassell, Orange, Calif. 92667

[21] Appl. No.: 905,130

[22] Filed: May 12, 1978

[51] Int. Cl.³ .............................................. G05B 19/29
[52] U.S. Cl. ..................................... 318/601; 318/603; 228/49 A; 228/105; 340/365 L
[58] Field of Search ............... 318/569, 574, 600, 601, 318/603, 696; 228/49 A, 105; 340/365 L

[56] References Cited

U.S. PATENT DOCUMENTS

| | | | |
|---|---|---|---|
| 3,611,358 | 10/1971 | Dalmasso | 340/365 L |
| 3,854,131 | 12/1974 | Vanderheiden et al. | 340/365 L |
| 3,941,985 | 3/1976 | Kawase et al. | 318/569 |
| 4,016,396 | 4/1977 | Hassan et al. | 318/601 |
| 4,125,798 | 11/1978 | Miller | 318/574 |

*Primary Examiner*—J. V. Truhe
*Assistant Examiner*—Eugene S. Indyk
*Attorney, Agent, or Firm*—Grover A. Frater

[57] ABSTRACT

Conventional mechanical positioning in which an input member is moved in a position field which is an enlarged representation of the output position field and conventional motorized positioning in which distance is represented by time of travel are modified and combined. The result is a method, and apparatus, in which movement but not position are represented mechanically on a field which represents any portion of the output field at which the output element is positioned. Input motion and direction are converted to digital or time duration signals. The result is apparent motion of the output element along whatever line is traversed mechanically by an input element. Input motion may be introduced at variable velocity. The input is introduced much as it is in a pantograph system but, unlike the pantograph system, the field of input motion is not a reproduction of the output motion field but represents, instead, any portion of the output field. That makes it possible to alter the ratio of input to output motion with ease.

17 Claims, 5 Drawing Figures

REMOTE POSITION CONTROL METHOD AND MEANS

REMOTE POSITION CONTROL METHOD AND MEANS

This invention relates to a method and means for the remote position control of an output element. In particular form it relates to improvements in wire bonding apparatus and methods.

BACKGROUND OF THE INVENTION

The wire bonding machine is but one example of many kinds of apparatus in which the position of an element in a plane is altered as a consequence of remotely developed motion or position signals. In its broader sense, this invention has general application in this field. However, the invention has a special meaning in the wire bonding machine field where it provides a new approach and a very practical solution to some long standing problems.

In a typical application, a wire bonding machine may be used to interconnect micro circuit points which are separated by distances from less than one millimeter up to about five millimeters using wires in the order of twenty-five micrometers diameter (0.001 inch). Those distances are too small to discern with the unaided eye. High powered stereo microscopes are used in which the field of view at the work plane may be only five millimeters in diameter. Obviously such small dimensions do not permit direct manipulation of position of work piece and bonding tool. Much of the manipulation is done by hand. Even in an automated bonding sequence initial orientation is accomplished manually.

Two different approaches have been utilized to provide remote, amplified, positioning capability to the bonding machine operator. One approach employs a mechanical pantograph such, for example, as the micro manipulator described in U.S. Pat. No. 3,474,685 to Miller. Movement of the manipulator handle of a very accurate pantograph is reproduced in movement of the work piece or the tool. The field of movement of the micro manipulator input handle corresponds exactly to the field of relative movement of the work piece and bonding tool. Thus, when the input handle is in the center of its field of movement, the work piece (or bonding tool) is in the center of its field of movement. When the input handle is at one edge of its field of movement, the work piece (or bonding tool) will be positioned at the corresponding edge of its field of movement. In some applications that micro manipulator cannot be beat but it does have limitations. As the division of movement is increased to accommodate smaller work pieces and work dimensions, the field of input handle movement must be increased. Accuracy and speed suffer as the field approaches the limit of operator finger and wrist movement. Further, the all-mechanical positioner is sometimes difficult to integrate with automatic positioners.

The second approach to positioning seeks to overcome the limitations of the all mechanical system by substituting time for distance as an input parameter. The usual apparatus employs a pair of stepping motors which rotate lead screws to move the work piece (occasionally the tool) in the X and Y directions, respectively, of the work plane. The stepping motor responds to electric switch operation and it turns the lead screw at some number of steps per unit of switch closed time. Two switches are employed, one for the X direction and one for the Y direction. There are mechanical arrangements for actuating two switches with one handle to permit movement in X and Y, simultaneously. That makes movement at forty-five degrees possible so that the work piece can be moved in X or Y or at forty-five degrees to X or Y. It is possible to change the ratio of steps per unit time to achieve movement at different rates and therefor at different specific angles, but that is neither practical nor is it capable of overcoming either of two major problems with the degree-of-movement-as-a-function-of-time approach to work piece positioning.

Positioning-as-a-function-of-change-of-position permits direct movement from one point to another along any path without limitation to X and Y and an intermediate angle two and it permits continuously variable rate of change of position. The problem with that approach is that the field of input movement must be an enlarged version of the whole field of work piece movement. That problem is solved in the positioning-as-a-function-of-time approach but the solution is gained at the expense of direct, continuously variable rate of change positioning. This invention makes it possible to combine the advantages of both systems in a single system and to do it at minimum expense in reliable form without any loss of accuracy, but with increased speed and accuracy.

SUMMARY OF THE INVENTION

It is an object of the invention to provide an improved position control generally, and an improved position control for wire bonding apparatus in particular.

Another object is to provide a position control method and apparatus in which a field of movement of an input member can be made to represent some portion at which the output member is located of the total field of movement of an output member.

A related object is to provide a method and means for altering the proportion of the whole field of output member movement that is represented by the field of movement of the input member.

Further objects are to provide an improved apparatus for digitizing analog displacement information and to provide an apparatus in which movement of an input element relative to the field, in which analog displacement takes place, can be rendered effective or ineffective as an input at will.

These and other objects and advantages of the invention which will become apparent upon a reading of the specification that follows are realized, in part, by the provision of a plurality of sensors arranged in a plane according to some system of coordinates, usually rectangular or polar. That is combined with a sensor activating element whose position with respect to the plane of the sensors can sense, and whose position can be changed relative to said plane and with a detector means for detecting the fact of a change in direction over the system of coordinates and the direction of movement of the activating element. In the preferred form, the detector means need only be capable of detecting that the activating element has moved from one line of the system to a second line of the same kind and whether the second line is on one side or the other side of said one line.

In preferred form a plurality of switches, preferably Hall effect switches, are arranged in lines and columns in a plane, preferably a flat plane, and are oriented so that they will be actuated to change their open or closed state when an activating element, such, for example, as one pole of a permanent magnet, is passed over them within some minimum distance from the plane. The switches are connected in a manner which permits identification of the line or column in which the switch is located from the fact of its actuation. An input position sensor of that construction, and a magnet are used together.

The magnet is placed on the surface of a unit in which the lines and columns of switches are contained in a plane parallel to that surface. Thus positioned, the magnet is moved over the surface. Each switch over which the magnet passes is opened (or closed) while the magnet is in close proximity. If all of the switches in a column or in a row are normally closed and in series of normally open and in parallel, the actuation of one of them alters current flow in that column or row.

A means is provided for identifying the columns and rows in which sensing has occured. In this example it senses rows and columns in which current change has occurred. It also identifies the direction in which the sensor activating element is being moved in terms of the coordinate system.

Each line and row of the coordinate system is identified preferably by a number such that its number is greater than that of the adjacent line or column on one side and smaller than the number of the adjacent line on the other side. A means is provided for determining whether the activating element has moved to a line or column of lower or higher number. That determination is made. Each move of the activating element from one row to the next is interpreted as an instruction to move the output element, such as a micro circuit to be bonded, in some given degree in X or Y or other coordinate system. Movement of the activating element from a row or column of one number to a higher number is interpreted as an instruction to move the work piece in a positive (or negative) direction. Movement of the element to a row or column of lower number is interpreted as an instruction to move the work piece in the opposite direction.

There is no need to correlate rows and columns of the input position structure with particular rows or columns in the field of work piece movement. In the case of an input element whose rows and columns are formed by Hall effect switches, the activating element might be no more than a short length of ferrite cylinder, a magnetized puck, that exhibits sufficient magnetic force to actuate the switches when moved over the surface of the switch grid structure and which will not actuate them when removed a small distance from that structure. An operator need only move the puck over the surface of the grid of sensors, or simply to stroke the surface while observing the position of the output member. The puck can be moved along any path and at any speed over any portion of the grid surface and the output element will move in a direction corresponding to the direction of puck motion and at a speed corresponding to the speed of puck movement. However, puck position does not correspond to output member position. As a consequence, any desired ratio of output member displacement to input member displacement may be selected and employed.

The passage of the input activating element from one line or one column to the next is noted and is converted to a digital or time duration signal. The sensor lines and sensor columns are identified so that it is possible by noting identity of the line from which and to which a sensor is moved to determine direction of motion in terms of the coordinate system of the grid.

In preferred form it is a feature of the invention to convert the output information from the sensor to a time duration signal or to its equivalent, some number of pulses of energy. Motive means capable of moving the output element in directions corresponding to the input element coordinate systems are energized for such times or by that number of pulses of energy. The use of stepping motors is especially preferred.

DRAWINGS

Figure 1:
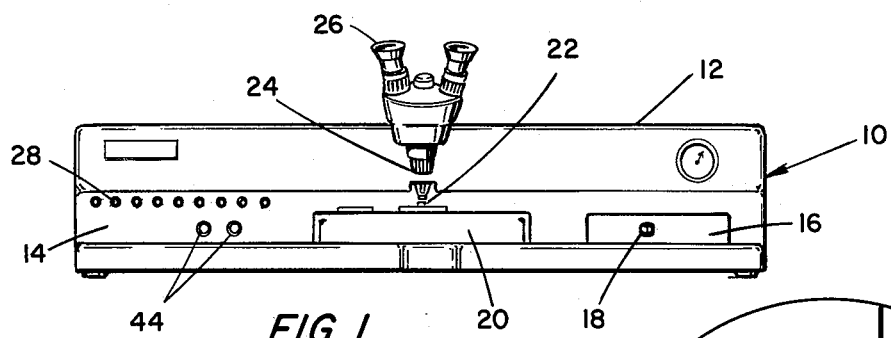
FIG. 1 is a view in front elevation of a bonding machine which embodies the invention.

The apparatus depicted in FIG. 1 is a wire bonding machine generally designated 10 which comprises a housing 12, a sloping front panel 14 at the right side of which is a generally rectangular input signal pad 16. A magnetic puck 18 rest on the pad. In the central portion of the unit is a work piece holder that extends forwardly of the housing. That holder is identified by the reference numeral 20. Its upper portion is movable relative to the remainder of the unit to carry a work piece 22 to different positions in a horizontal plane relative to a bonding tool whose work tip 24 is just visible in the drawing. The bonding tool and the plane of the work piece are visible through a stereo microscope 26 which is mounted on the case 12. At the left is a set of contols 28 which are employed in controlling the supply of power to the machine and in controlling the several steps involved in the bonding function.

Figure 2:
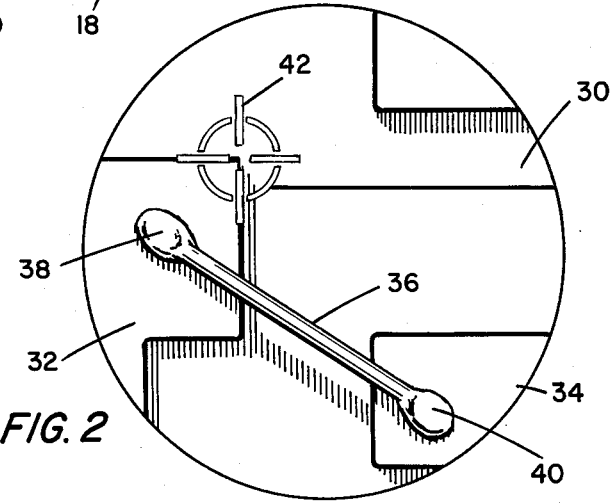
FIG. 2 is a view of what might be seen through the stereo microscope of a wire bonding machine in a representative case.

The apparatus of FIG. 1 is employed in completing wire bonds between the several circuit points of microminiature circuit devices such as transistors and integrated circuit devices. Viewed through the stereo microscope, a representative work piece might appear as shown in FIG. 2 where a portion of an integrated circuit device 30 is visible in the field of the view of the microscope. That device includes a circuit pad 32 and another circuit pad 34 which have been interconnected by a fine wire 36 which is bonded at the compressed region 38 and to the pad 32 and is bonded at its other end 40 to the pad 34. The target or reticle 42 which is visible in the upper left portion of the field of view is formed by transmitting light in the pattern shown onto an optical element in the microscope system. That reticle is fixed relative to the instrument and to the line of action of the bonding tool element 24. Manipulation of the puck over the surface of the input pad 16 results in movement of the work piece holder 20 and of the work piece 22 and the portion 30 of that work piece relative to the reticle 42. Degree of movement of the work piece 22 and the direction of that movement correspond to the degree of movement and the direction of movement of the magnetic puck 18 over the surface of pad 16. The direction of work piece movement and the degree of work piece movement are independent of the position of puck 18 on the input pad 16.

The puck 18 is not fastened to the pad. It can be removed, placed anywhere on the pad and moved in selected direction and then removed. It can be removed and moved over the pad to another position, placed on the pad again and moved across the pad in a stroking action. The result will be movement of the work piece in a degree and in a direction corresponding to the movement of the puck while it is moved over and against the surface of the pad 16, but the work piece will not be moved to correspond to movement of the puck when the puck is lifted away from the pad 16.

The work piece 20 moves as a consequence of rotation of two stepping motors, one arranged so that the work piece is moved in a direction into and out of the page on which the drawing appears. Motion in that direction is called motion in the Y direction. The other stepping motor rotates to move the work piece holder and the work piece in a direction from side to side in the plane of the page on which the drawing is made. Motion in that direction is called motion in the X direction. All motion of the work piece is accomplished as a combination of motion in the X direction and the Y direction. To one who views that motion through the stereo microscope 26, the work piece will appear to be moving in a direction corresponding exactly to the direction in which the puck 18 is moved over the surface of pad 16. The work piece will appear to move at the speed that corresponds, relatively, to the speed at which the puck is moved over the pad 16. The operator has control in switches 44 at the left in FIG. 1 of the ratio of work piece movement to puck movement. In addition to that, pad 16 contains special switches along its margins which, if activated, result in very rapid movement of the work holder 20 and of the work piece 22. If the puck 18 is moved to the bottom of the pad 16 the holder 20 will be moved toward the operator in the negative Y direction. The effect of that will be to make the reticle appear to move in the positive Y direction relative to the work piece. Conversely, moving the puck to the upper margin of the pad 16 will actuate switches there and cause the holder 20 to move away from the operator which will make the reticle 42 appear to move in the negative Y direction relative to the work piece. Moving the puck to the right and left edge, respectively, of the pad 16 will actuate switches which will move the work holder so that the work piece will appear to move to the right in the positive Y direction and to the left in the negative X direction, respectively, with respect to the reticle.

Figure 3:
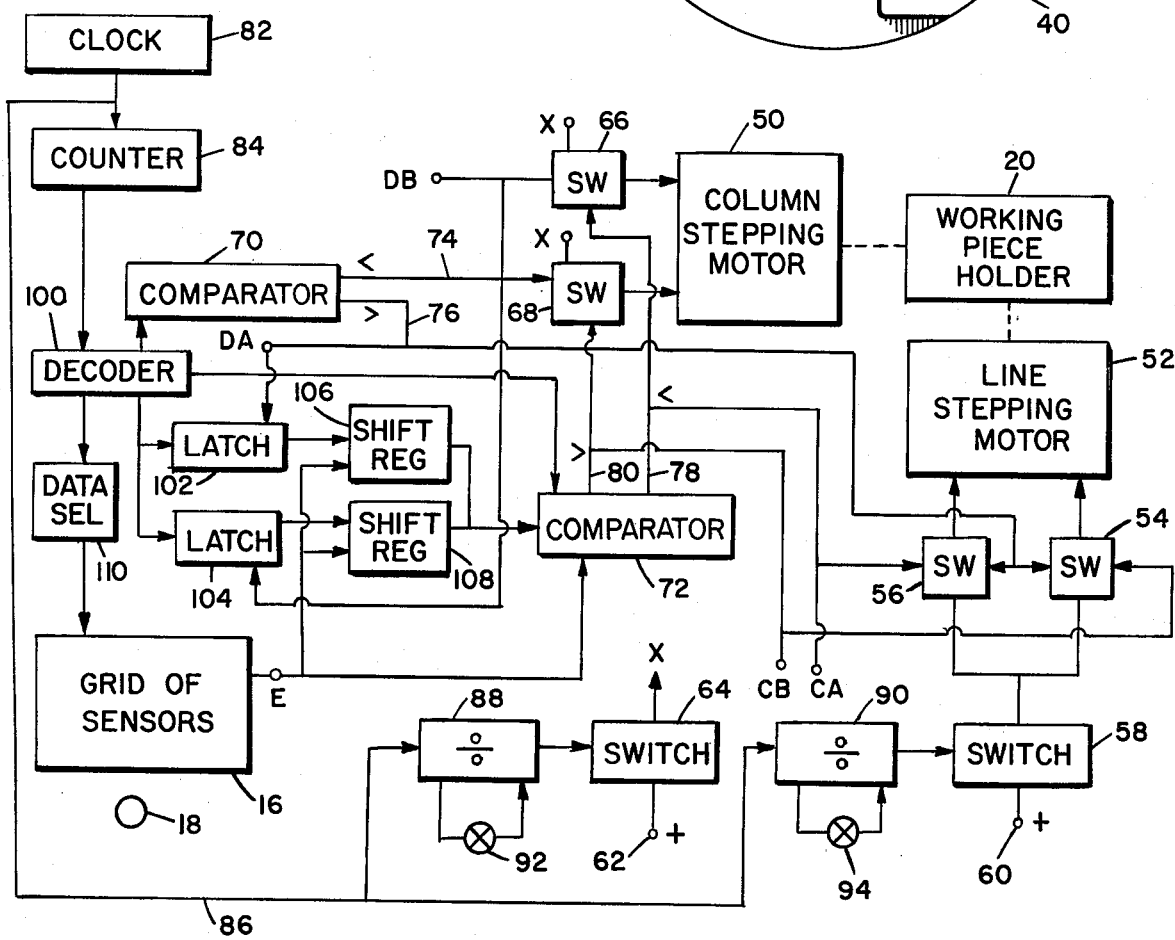
FIG. 3 is a block diagram of a system which embodies the invention.

FIG. 3 is a block diagram of the elements that provide the operation thus described. All of its elements, other than the puck 18 and the work piece holder 20, are standard, readily available, electrical and electronic components so that they have been shown in block diagram form. The work piece holder 20 is simply a metal block which is provided with clamping elements to hold the work piece in place and is arranged for motion in the X and Y direction by a pair of stepping motors. Construction of such holders is shown in the patent literature and is well within the skill of the ordinary artisan to produce. The two stepping motors, 50 and 52, are conventional in form. The motor 50 is designated the COLUMN STEPPING MOTOR and the other, 52, is designated the LINE STEPPING MOTOR. Each is provided with two inputs, one to cause counterclockwise rotation of the output element and the other to cause clockwise rotation of that element. Power is applied to stepping motor 52 through switch 54 when the motor is to be rotated clockwise and through switch 56 when it is to be rotated in the counterclockwise direction. In either event, power is supplied to those switches through a switch 58 from a power terminal 60. Power for the column stepping motor 50 is supplied from a positive power terminal 62 through a switch 64 which is in series with two switches, one 66 which is closed when the column stepping motor is to be rotated in the counterclockwise direction. The other switch 68 is closed when the column stepping motor 50 is to be rotated in the opposite direction. Switches 54, 56, 66 and 68 are solid state devices which are normally non-conductive but are rendered conductive in response to simultaneous application of two enabling signals. Those enabling signals are applied by comparators 70 and 72. Each of those comparators has two output terminals, one of which is energized when the input signal to the comparator exceeds the numerical value of some reference number which, in the case of comparitor 70, is arranged for by the wiring of the comparator. In the case of comparator 72, the numerical value of two input signals is compared as described below.

In the case of comparator 70, output line 74 is energized when the input signal to the comparitor is less than the reference number. The other output line 76 is energized when the input number to the comparator is greater than the reference number. In case of comparator 72, output line 78 is energized when the input number is less than the reference number, and output line 80 is energized when the input signal represents a greater number than does the reference signal.

Timing of system operation is controlled by a clock 82 whose output is a series of pulses which are applied to a counter 84 and by a line 86 to the input of a divide unit 88 whose output is used to control operation of solid state switch 64. Clock pulses on line 86 are also applied to a divide unit 90 whose output is applied to control the operation of solid state switch 58. In each case, the divisor, or the number by which input pulses are divided, is controlled by a switch. In the case of divided 88, the switch is identified by the numeral 92. The switch 94 is associated with the divider 90.

Returning to counter 84, its output is furnished to a decoder which converts the input count to a coded number. In this case, it converts the input signal to a binary coded decimal number which is applied to comparator 70 and to comparator 72. The decoded number is also applied to each of two latches, 102 and 104. The output of latch 102 is applied to a shift register 106, and the output of latch 104 is applied to a shift register 108. Output of the decoder 100 is also applied to a data selector 110 whose function is to select the lines and the columns of the grid sensors unit 16 in sequence on successive pulses from clock 82.

In the preferred form of the invention, selected for illustration in the drawing, two Hall device switches are mounted together and are positioned in a rectangular grid so that the pairs of switches are arranged in rows and columns. One switch of each pair is connected with the remaining switches so that it appears in a line. The other switch of each pair is connected with the remaining switches so that it appears in one of the columns. As a consequence of that arrangement, when the puck 18 is positioned over a pair of switches, both of the switches are actuated and one of them designates a line and the other designates a column. This will be described subsequently. The operation of the data selector is such that first, all of the columns and then all of the lines are interrogated, in order to determine whether or not one of the switches is closed. The switches are arranged in pairs. If one of them is closed, its companion is closed. The number of the line in which a closed switch appears is stored in latch 102 and is transferred to shift register 106. The number of a column that contains a closed switch is stored in latch 104 and is then transferred to shift register 108. That selection is accomplished with enabling signals derived from the comparator 70. Comparator 70 has a number stored in it such that input numbers lower than that number represent columns and input numbers higher than that stored number represent lines. When the input number is lower than the stored number, line 74 is energized and an enable signal is applied to latch 104 so that it can store the current number applied to it by the decoder. The number is immediately transferred to the shift register 108. When the number applied to comparator 70 by the decoder is greater than the number stored in comparator 70, then an enable signal will appear on line 76. That applies an enable signal to latch 102 which stores the number output from the decoder and transfers it immediately to shift register 106. The numbers in the two latches are shifted to their corresponding shift registers and are applied to comparitor 72 whenever an enable signal is applied to the shift registers. That enable signal is the signal that appears at the output E of the grid of sensors unit 16 whenever a line or a column is interrogated which has a closed switch. In the comparator 72, the number from the shift register, if any, is compared with the number applied by the decoder 100. If the number from the decoder is higher than the number applied by the shift register, then an enable signal appears on line 80. Conversely, if the current number applied by decoder 100 to comparator 70 is less than the number that is applied by one of the shift registers, then it is the other output line 78 of the comparator that is supplied with the enable signal.

Thus it is that comparator 72 applies output signals to lines 74 or 76 to select either the column stepping motor or the line stepping motor. Comparator 72 selects whether the stepping motor will rotate clockwise or counterclockwise.

Figure 4:
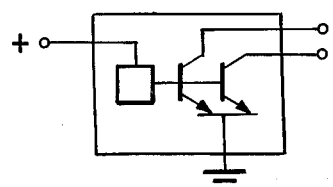
FIG. 4 is the schematic diagram of a Hall effect switch.
Figure 5:
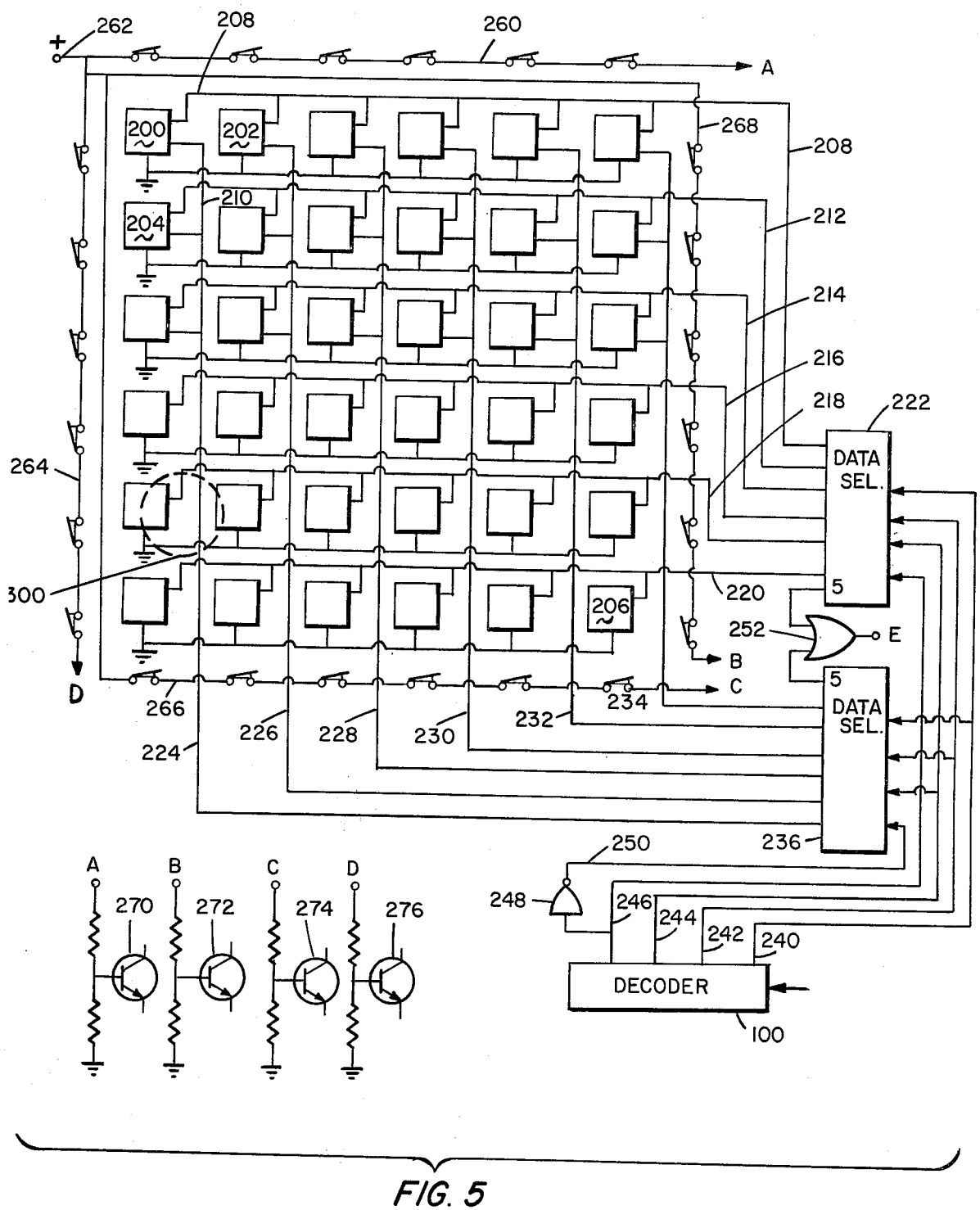
FIG. 5 is a diagram partly schematic and partly in block diagram form of elements of FIG. 3.

FIG. 4 is a drawing of the circuit diagram for a Hall effect switch. A suitable switch is Micro-Switch brand, number 65-SS4. Other switches made by other manufacturers are equivalent. Each package contains two switches. Both are normally non-conducting and are rendered conducting when a magnet of proper polarity is placed in close proximity to the surface of the package. Thirty-six of those dual switch devices are shown in FIG. 5 where one of them has been given the reference numeral 200 as an identifier. It and the adjacent device 202 are elements in an upper line of six elements. Devices are arranged in six lines and in six columns. Device 200 and device 204 form part of the first column. Device 206 lies in the sixth line and in the sixth column. One of the switch transistors of each of the devices in the first line has its collector connected to line 208. Each of the devices in the first column has the collector of its other device connected to a line 210. In the case of each unit, the emitters of both switching transistors are connected to ground. If any of the transistors that are connected to line 208 are rendered conductive by the approach of the magnet, current will flow in line 208. Similarly, if a magnet of proper polarity is brought close to any of the devices in the second line, a current will flow in line 212. If the magnet is brought close to one of the devices in the third line, current will flow in line 214. Similarly, if the magnet is brought close to one of the devices in lines 4, 5 and 6, current will flow in lines 216, 218 or 220, respectively. Current flow in those lines is equivalent to applying a signal to one of the input terminals of a data selector 222.

The other switching transistor of each of the Hall effect devices is connected in one of the columns. Those that are connected in the first column close to permit current flow in line 224. When a magnet is brought close to one of the devices in the second or third or fourth or fifth or sixth column, current will flow in the corresponding one of lines 226, 228, 230, 232 and 234. Those lines 224 through 234 are connected to input terminals of a second data selector device 236. Those two devices, 222 and 236, correspond to the data selector 110 of FIG. 3.

Pulses from a counter are applied to the decoder unit 100 of FIGS. 3 and 5, and they are decoded to apply signals to one or more of output lines 240, 242, 244 and 246. An invertor 248 is connected to invert the signal on line 246 and apply it to line 250. Signals from lines 244, 242 and 240 are applied to both of the data selectors 222 and 236. The signal of line 246 is applied to data selector 222 and signal on line 250 is applied to data selector 236. The combination of signals on those several lines designates one of the input lines to each of the data selectors. The signal on the selected line is applied to one of the inputs of NAND gate 252. The output of the gate appears at terminal E. This embodiment employs TTL devices 74151 as selector units, and the output signal is an inverted signal taken at pin 5 and applied to the NAND gate.

In addition to the Hall effect devices previously described, the input pad 16, which is depicted by the grid of switch elements in FIG. 5, includes four sets of magnetically actuated normally closed "reed" switches. One of those sets is designated 260. It comprises a number of switches in series between a positive power input terminal 262 and an output line A. That series of switches is located across the upper edge of the input pad 16. A similar line of switches of the same kind are connected in series from the power input terminal 262 to an output terminal D. That switch set which is designated 264 is located along the left edge of the input pad 16. A third set 266 of such switches are connected in series from power terminal 262 to a circuit connector C and are located along the lower edge, the edge toward the operator in FIG. 1, of the input pad 16. Finally, a fourth series 268 of such switches is connected from the power terminal 262 to a circuit point B. Those switches are located along the right edge of the input pad 16. In each case, the terminals A, B, C and D connect to the terminals of corresponding designation in the lower left corner of FIG. 5. They are connected to a voltage divider in each case, the tap of which is connected to the base of a switching transistor. Switching transistor 270 is associated with terminal A. Switching transistors 272, 274 and 276 are associated with terminals B, C and D, respectively. Switches 270 and 272 correspond to switch 94 in FIG. 3. Switches 274 and 276 of FIG. 5 correspond to switch 92 of FIG. 3. The operation of those switches operates to increase the number of pulses that are delivered to the stepping motors for each clock pulse so that rapid movement of the work piece is the result. The circuit points A, B, C and D are connected in pairs to the circuit points of FIG. 3 to permit operation of the column stepping motor or the line stepping motor in a counterclockwise direction according to which edge of the input pad is subjected to the action of the magnetic puck 18.

The input pad of FIG. 5 having been described, some of the advantages of the invention can be more readily understood. The dotted circle 300 in FIG. 5 represents the magnetic puck 18. It and the switch packages 200, 202, etc. and the spacing between them are shown approximately twice the size that they have in one embodiment. The puck is three-eighths inch in diameter. The switch packages are about three-eighths inch on a side and are spaced three-eighths of an inch apart. A pad and a puck of that size can be used to control movement of an output member over any distance from increments less than one-thousandths of an inch as in a wire bonder to distances measured in feet and more. In practice, the puck and switches may have sizes and spacing very much smaller or very much larger than what is shown.

In the description of the prior art above, the use of X and Y direction control switches to control positioning motor operation was criticized because that scheme permits only X and Y movement and, when both switches are closed, movement at forty-five degrees to the X and Y directions. At first blush, it would appear that the same criticism can be levelled at the input pad of FIG. 5. The switches are arranged in pairs at the intersection points of a rectangular grid. Each time the puck is moved to a point proximate to a switch both a line switch and a column switch are actuated. It would appear that the only effective switch action occurs when the puck is moved along a line or along a column or in a direction forty-five degrees from line or column direction. That is not true. If the puck 300 in FIG. 5 is moved from the position shown directly toward a point in the mid-region of switch package 202, the puck will cross several lines before having gained enough displacement to the right to actuate a switch in the second column. It is true that the output element will move only in X and Y directions, but when the input pad of FIG. 3 is used, X and Y movement is interspersed in time or occurs simultaneously so that the output member appears to move directly from a starting point to an ending point along a line that duplicates the line of movement of the puck and at a speed that is proportional to the speed at which the puck was moved. The result is that one viewing movement of the work piece in the microscope of FIG. 1 observes a reaction that corresponds directly to his hand minipulation of the puck except that he can remove the puck and replace it on the input pad without any output reaction.

Only movement from one line or column to the next line or column produces a reaction in the preferred embodiment so placing the puck on the input pad does nothing to move the output member. It matters not whether the puck is placed on a switch, next to a switch or between switches.

It is possible by increasing puck diameter relative of switch size or spacing to arrive at a size in which the puck will actuate two pairs of switches when positioned midway between lines or columns. In that circumstance, movement of the puck along the line results alternately in actuation of one pair and two pairs of switches. That is true also of movement along a line. That action can be interpreted as equivalent to having added a line between lines and a column between columns. Thus, movement from a condition in which one switch of a line is actuated to a condition in which adjacent switches of the line are actuated can be interpreted as movement from one line to the next. Further, movement to a condition in which only one switch is actuated can be interpreted as movement from said next line to a further line whereby resolution has been doubled by increasing puck diameter. That can be dealt with in the circuit of FIG. 3 by proper coding at decoder 100 to give numbers to such dual switch operated lines and columns.

Another variation which has advantages in some instances combines manual operation of a run or slew switch with puck movement from any position to a second position such that the puck actuates a switch in another line or column. When that is done, the X or Y stepping motor operates to move the work piece rapidly in the direction of puck movement until the run or slew switch is released. That method of operation permits a combination of slewing and five position control which is advantageous when successive bond points are a substantial distance apart and it is useful in moving the "playing piece" in electronic video games.

The embodiment depicted in the drawings and described above is the one that is now preferred. It is to be understood, however, that a number of variations in the invention are possible and that the invention is not to be considered to be limited by the particulars of the embodiment shown, but is, instead, to be measured by the scope of the appended claims. For example, it is not essential, in the broader consideration of the invention, that Hall effect devices by used. Other switches may be employed either in normally closed or in normally open form. Other logic arrangements are possible for converting input signal information into appropriate form for controlling the application of energy to the stepping motors or to whatever motive means is employed to move the work piece. In addition to being useful in controlling the relative position of a work piece in a bonding tool, the invention, in its broader sense, has application in other fields. Such a field, for example, is one where the apparatus provided by the invention can be utilized to move the image in cathode ray monitor scopes whether the scope is used in connection with an electronic game or some more useful purpose. This list of variations is not intended to be exhaustive. In fact, a variety of applications and variations in the invention are possible.

I claim:

1. The method of changing the relative position of two relatively movable elements from an unspecified initial position in response to movement of a detectible element over a set of coordinates formed by detector elements arranged in a pattern of lines in each of two directions which method comprises the steps of:
    (a) displacing the detectible element relative to the coordinate set;
    (b) detecting the degree of displacement and the direction of displacement of the detectible element relative to the coordinate set;
    (c) moving said movable elements from said unspecified initial position relative to one another in the direction of displacement detected through a distance proportional to the degree of displacement detected.

2. The method defined in claim 1 in which the step of moving said movable elements comprises moving one of said movable elements in a predetermined degree in one of said two directions when said detectible element is first detected by an element of a coordinate line in said one direction and moving said one of said movable elements in a predetermined degree in the other of said two directions when the detectible element is first detected by an element of a coordinate line in said other of said two directions.

3. The method of controlling the relative position of a work piece and a bonding tool in a bonding machine which includes a motive means for moving a movable one of the work piece and tool in each of two mutually perpendicular directions by moving a sensor activator relative to a coordinate system formed of lines and columns of sensors which method comprises the steps of:
 (a) observing the initial position of the movable one of said work piece and tool relative to the other;
 (b) moving the sensor activator to a position in which its position is sensed by said sensor;
 (c) moving the sensor activator in a direction corresponding to the direction in which said movable one of said work piece and tool must be moved to accomplish positioning them in a given second relative position;
 (d) causing the motive means to move said movable one of the work piece and tool in a predetermined degree in one of said two directions when the sensor activator first causes activation of a sensor of a line after previously having caused activation of a sensor of an adjacent line; and
 (e) causing the motive means to move said movable one of the work piece and tool when the sensor activator first causes activation of a sensor of a column after previously having caused activation of a sensor in an adjacent column.

4. The invention defined in claim 3 in which said motive means is made to move the movable one of said work piece and tool in a predetermined degree by energizing said motive means for a predetermined period of time.

5. The invention defined in claim 3 in which said motive means is capable of moving the movable one of said work piece and tool in a degree proportional to the number of pulses of energy that are furnished to said motive means, and in which the motive means is supplied with a predetermined number of pulses on the occasion of the sensor of a line first sensing the presence of the actuating member after its presence is sensed by a sensor of an adjacent line.

6. In combination:
 a plurality of switches arranged in lines and columns in a plane said switches being responsive to proximity of an activating element to change their state;
 an actuating member capable of placement in proximity to said switches;
 means responsive to a change in state of any of said switches for identifying in which column and line said switch is located; and
 said switches being disposed in pairs at the intersection of lines and columns and interconnected such that one of each pair is in a line and the other in a column.

7. The invention defined in claim 6 in which said switches are solid state devices operable to change state in response to the Hall effect and in which said activating element is a magnet.

8. The invention defined in claim 6 in which said switches are normally open and are connected such that the switches of a line are connected in parallel with one another and such that the switches of a column are connected in parallel with one another.

9. The invention defined in claim 8 which further comprises means for determining as a consequence of change in switch state whether said activating element has been moved from the proximity of one line to another and whether the activating element has been moved from the proximity of one column to another.

10. The invention defined in claim 9 which further comprises means for determining whether said actuating element in being moved from the proximity of a first line or column to the proximity of another line or column has been moved to one side or to the other side of said first line or column.

11. The invention defined in claim 10 which further comprises a movable element and means for moving said element in one given degree in one direction from its initial position in response to movement of said activating element from the proximity of any one of said lines to proximity of an adjacent line and for moving said element in another direction in one given degree from its position in response to movement of said activating element from the proximity of any one of said columns to proximity of an adjacent column.

12. The invention defined in claim 11 in which said means for moving said element comprises a pair of stepping motors one responsive to movement of the activating element across lines and the other responsive to movement of the activating element across columns.

13. The invention defined in claim 12 which further comprises a marginal line and a marginal column of switches at the margins of said grid of switches, said switches of the marginal column and line being responsive to change state when proximate to an activating element;
 means responsive to change of state of a switch in the marginal line to cause said means for moving said element to move said element for the period in which the state of said switch is changed in said one direction; and
 means responsive to change of state of a switch in said marginal column to cause said means for moving said element to move said element in said other direction for the period during which said switch in the marginal column has its state changed.

14. In a wire bonding machine of the kind in which positioning of a work piece relative to the line of action of a bonding tool by moving one of them as the movable element is accomplished in two dimensions, capable of identification as X and Y, using a motor driven X-Y positioner is accomplished by furnishing X input and Y input signals, the improvement which comprises the inclusion of:
 (a) a means for representing a grid of at least three lines and at least three columns;
 (b) a detectible member movable over said grid in a manner such that it can pass said successive ones of said lines and columns and the spaces between them proximately thereto;
 (c) input signal generating means for generating like X and like Y input signals on the occasion of said detectible member passing any successive pairs of lines and passing any successive pairs of columns, respectively, whereby the relative position of bonding tool and work piece is changed in response to movement of the detectable member relative to said grid and independently of the position of the detectable member on the grid.

15. The invention defined in claim 14 in which said input signal generating means is effective to generate input signals on the occassion of said detectible member having moved past a line or column and a space intermediate lines or columns.

16. The invention defined in claim 14 in which said means for representing a grid of lines and columns comprises switches arranged in pairs located substantially at the intersection of lines and columns and interconnected such that one switch of each pair is in a line and the other in a column.

17. The method defined in claim 1 in which said movable elements are moved relative to one another for a portion of the relative distance moved as a function of time without regard to said degree of displacement detected.

* * * * *